United States Patent

Tanaka et al.

Patent Number: 5,128,213
Date of Patent: Jul. 7, 1992

[54] SLIDING MATERIAL OF SINGLE SUBSTANCE AND COMPOSITE SLIDING MATERIAL

[75] Inventors: Tadashi Tanaka, Konan; Masaaki Sakamoto, Nagoya; Koichi Yamamoto, Komaki; Yoshiaki Sato, Gifu, all of Japan

[73] Assignee: Daido Metal Company Limited, Nagoya, Japan

[21] Appl. No.: 762,965

[22] Filed: Sep. 20, 1991

[30] Foreign Application Priority Data

Sep. 20, 1990 [JP] Japan ................ 2-251295

[51] Int. Cl.⁵ .............................. G22F 3/00
[52] U.S. Cl. .................... 428/552; 428/553; 25/230; 25/231; 25/236; 25/244
[58] Field of Search .......... 75/244, 230, 246, 231; 428/552, 553

[56] References Cited

U.S. PATENT DOCUMENTS

| | | | |
|---|---|---|---|
| 4,233,072 | 11/1980 | Watanabe et al. | 75/236 |
| 4,435,482 | 3/1984 | Futamura et al. | 428/553 |
| 4,623,595 | 11/1986 | Futamura et al. | 428/553 |
| 4,832,734 | 5/1989 | Benn et al. | 75/249 |
| 4,938,810 | 7/1990 | Kiyota et al. | 148/437 |
| 5,041,339 | 8/1991 | Mori et al. | 428/552 |

FOREIGN PATENT DOCUMENTS

| | | |
|---|---|---|
| 0147769 | 7/1985 | European Pat. Off. |
| 0213528 | 3/1987 | European Pat. Off. |
| 0213615 | 3/1987 | European Pat. Off. |
| 0262869 | 4/1988 | European Pat. Off. |
| 0319295 | 6/1989 | European Pat. Off. |
| 0363225 | 4/1990 | European Pat. Off. |
| 1-27122 | 5/1989 | Japan . |
| 2179369 | 12/1988 | United Kingdom . |
| 2184133 | 7/1989 | United Kingdom . |

Primary Examiner—Stephen J. Lechert, Jr.
Attorney, Agent, or Firm—Browdy and Neimark

[57] ABSTRACT

A sliding material of a single substance made by extruding powder comprises aluminum as a main constituent, and at least one metal compound of 0.5 to 30 wt. % in total selected from the group consisting of metal nitride, metal carbide, metal phosphide, and metal boride, each of which has a hardness not less than 200 in Vicker's hardness, the metal compound being uniformly and finely dispersed in aluminum.

7 Claims, No Drawings

SLIDING MATERIAL OF SINGLE SUBSTANCE AND COMPOSITE SLIDING MATERIAL

BACKGROUND OF THE INVENTION

1. Field of the Invention

The present invention relates to a sliding material of a single substance and a composite sliding material made by extruding powder. More particularly, it relates to an aluminum-based sliding material of a single substance and a composite sliding material which are made by extruding powder and which have excellent resistance to wear and an excellent antiseizure property.

2. Description of the Related Art

An example of a conventional aluminum-based sliding material made by extruding powder is, for example, disclosed in Japanese Patent Examined Publication No. 1-27122. The composition of this material contains in aluminum matrix, as an indispensable constituent, 0.5 to 40 wt. % of one or more kinds selected from the group consisting of Pb, Sn, an alloy thereof, a metal sulfide, metal oxide, metal fluoride, graphite, PTFE, or a plastic material such as polyamide, and one or more kinds selected from the group consisting of Cu, Ni, Si, Mg and Zn added as an optional element.

Although the above-described well-known aluminum-based sliding material has excellent properties, there arise such problems as abnormal wear and seizure, because internal engines are used under severe conditions of high load and high rotation with the recent advancements made regarding the development of internal engines.

SUMMARY OF THE INVENTION

An object of the present invention is to obtain a sliding material of single substance and a composite sliding material in which constituents are selected to improve resistance to wear and antiseizure property.

To this end, according to the present invention, there is provided an aluminum-based sliding material of a single substance and a composite sliding material, in each of which at least one kind of an additive of 0.5 to 30 wt. % in total selected from a group consisting of a metal nitride, metal carbide, metal phosphide, and metal boride each having a hardness not less than 200 in Vicker's hardness is contained in a uniformly and finely dispersed state in aluminum or aluminum alloy matrix. In detail, the essential points of the present invention are the following (1) to (7):

(1) A sliding material of a single substance made by extruding powder, comprising aluminum as a main constituent, and at least one metal compound of 0.5 to 30 wt. % in total selected from the group consisting of metal nitride, metal carbide, metal phosphide, and metal boride, each of which has a hardness not less than 200 in Vicker's hardness, said metal compound being uniformly and finely dispersed in aluminum.

(2) The sliding material of a single substance comprising, in addition to the materials of the above (1), a lubricant material of low-melting point metal of 0.1 to 20 wt. % in total.

(3) The sliding material of a single substance comprising, in addition to the materials of the above (1), a solid lubricant material of 0.1 to 20 wt. % in total.

(4) The sliding material of a single substance comprising, in addition to the materials of the above (1), a lubricant material of low-melting point metal of 0.1 to 20 wt. % in total and a solid lubricant material of 0.1 to 20 wt. % in total.

(5) The sliding material of a single substance comprising, in addition to the materials of any one of the above (1) through (4), an aluminum matrix-strenghthening material of 0.1 to 20 wt. % in total.

(6) A composite sliding material of a single substance wherein the materials of any one of (1) through (5) are bonded to a back metal of steel.

(7) The composite sliding material wherein a bonding layer is provided between the materials of any one of (1) through (5) and the back metal of steel.

An explanation of each constituent in an aluminum-based sliding material of the present invention and the reasons as to why each of the constituents is limited to the numeral ranges shown in the above (1) to (5), and the kinds of each constituent will be listed below.

(1) Regarding a sliding material of a single substance made by extruding powder, comprising aluminum as a main constituent, and at least one metal compound of 0.5 to 30 wt. % in total selected from the group consisting of metal nitride, metal carbide, metal phosphides, and metal boride, each of which has a hardness not less than 200 in Vicker's hardness, said metal compound being uniformly and finely dispersed in aluminum:

(a) As the result of an additive being uniformly and finely dispersed, when it is used as a sliding bearing, only soft Al matrix is worn down on the surface, and, as a result, the surface becomes irregular from a micro point of view. The metal compound on a projected section maintains its non-adhesion property while the metal compound on the projection section is withstanding loads and shows resistance to wear and an antiseizure property. The recessed section plays the role of an oil reserve. Thus, it is easy to maintain oil films, thus preventing an oil shortage. Additive agents having a hardness smaller than 200 Hv do not aid in improving the resistance to wear.

(b) When the amount of metal compound added to the sliding material is 0.5 wt. % or less, the characteristics shown the above (a) cannot be obtained. When the amount of metal compound added is 30 wt. % or more, this material becomes brittle in addition to inferior impact fatigue strength, and it becomes poor in plastic workability with respect to extruding and etc. used in manufacturing.

(2) Regarding low-melting point metal of 0.1 to 20 wt. % in total:

(a) This material improves antiseizure property and machinability.

(b) When the amount of metal compound added is 0.1 wt. % or less, it has no such effect as shown above (a). When the amount of metal compound added is 20 wt% or more, a uniform dispersion into an Al matrix becomes very difficult. Furthermore, it causes an influence on the fatigue strength.

(3) Regarding a solid lubricant material of 0.1 to 20 wt. % in total:

(a) This material improves antiseizure property.

(b) When the amount of metal compound added is 0.1 wt. % or less, the characteristics shown in the above (a) cannot be obtained. When the amount of metal compound added is 20 wt. % or more, the sliding material becomes embrittled and further fatigue strength decreases. Furthermore, it causes poor plastic workability regarding extruding etc. used in manufacturing.

(4) Regarding an aluminum strength-increasing material of 0.1 to 20 wt. % in total:

(a) This material improves the mechanical strength of an Al matrix.

(b) When the amount of metal compound added is 0.1 wt. % or less, it has no such effect as shown in the above (a). When the amount of metal compound added is 20 wt. % or more, it becomes too hard, and plastic workability and compatibility become extremely poor.

(5) The metal compound is the following:

Metal nitride, metal carbide, metal phosphide, and metal boride.

(6) The metal nitride is the following:

h-BN (hardness: 300 Hv), c-BN (hardness: 4500 Hv), $Si_3N_4$ (hardness: 2000 Hv), AlN (hardness: 1200 Hv), TiN (hardness: 1950 Hv), etc.

(7) the metal carbide is the following:

SiC (hardness: 2400 Hv), $B_4C$ (hardness: 300 Hv), WC (hardness: 1780 Hv), TiC (hardness: 300 Hv), etc.

(8) The metal phosphide is the following:

$Fe_2P$ (hardness: 1100 Hv), $Ni_3P$ (hardness: 900 Hv), etc.

(9) The metal boride is the following:

$Ni_4B_3$ (hardness: 1000 Hv), $Ni_2B$ (hardness: 1000 Hv), etc.

(10) The lubricant material of low-melting point metal is the following:

Pb, Sn, Bi, or alloys thereof.

(11) The solid lubricant material is the following:

metal sulfide, metal oxide, metal fluoride and graphite etc.

(12) The metal sulfide is the following:

MoS, PbS, etc.

(13) The metal oxide refers to the following:

PbO, $Pb_3O_4$, $TiO_2$, CdO, $ZrO_2$, $Al_2O_3$, $SiO_2$, MgO, $Y_2O_3$, BeO, CaO, $Fe_2O_3$, $Cr_2O_3$, etc.

(14) The metal fluoride is the following:

$CdF_2$, $BaF_2$, $PbF_2$, etc.

(15) The aluminum strength-increasing material is the following:

Si, Mg, Cu, Ni, Zn and Mn.

DESCRIPTION OF THE PREFERRED EMBODIMENT

Example 1

Method of manufacturing sliding materials of a single substance

The constituent powders regarding sample No. 1 to 20 shown in Table 1 were mixed. These mixed powders were then formed under a pressure of 1.5 to 2.5 ton/cm². For Al, Si, Mg, Cu, Ni, Si, Mg, Zn or Sn, single substance powders or alloy powders of −60 Mesh were used. For Pb, Sn, B and C, single substance powders or alloy powders of −350 Mesh were used. For metal compound, powders having a grain size of 1 to 20 μm were used. Next, heat treatment was performed for four hours at a temperature of 350° C. which was lower than a solidification start temperature of an Al alloy. Thereafter, a heat-treated and compacted (compressed powders) material was inserted into a tool-steel-made container. An extruding working was performed under a pressure of 2 to 3 ton/cm² by using a push rod. The extruding ratio is 10 to 30 times (a reduction rate of 1/10 to 1/30). Next, a heat treatment was performed at a temperature of 350° C. for four hours. Then, the heat-treated extruded material was fed between the rolls of a rolling machine. It was rolled at a reduction ratio of 50% and adjusted to a predetermined thickness.

An annular test piece for a seizure test (a thrust washer type) having an outer diameter of 27.2 mm and an inner diameter of 22 mm was prepared from the above-mentioned material, and the seizure test was carried out under the conditions shown in Table 2. The results of the test are as shown in Table 4 (see Sample Nos. 4, 5 and 15).

Also, a test piece for a friction test (a thrust washer type) was prepared from the above-mentioned material, and the friction test was carried out under the conditions shown in Table 5 (see Sample Nos. 4, 5 and 15).

Example 2

Method of manufacturing composite sliding materials having no bonding layers

Sample Nos. 1, 2, 6, 7 and 16 of a sliding material of a single substance produced in Example 1 were stacked on steel plate having a thickness of 2 mm and roll-pressed at a reduction ratio of 40%. Thus, a composite sliding material wa produced. The thickness of the steel plate at this time wa 1.2 mm, and the thickness of the sliding layer was 0.5 mm. A seizure test was carried out under the conditions shown in Table 2. The results of the test are as shown in Table 4. A friction test was carried out in the same manner as in example 1. The results of the test are as shown in Table 5.

Example 3

Method of manufacturing composite sliding materials having bonding layers

Between each of Sample Nos. 3, 8, 9, 11, 12, 13, 14, 17, 18, 19 and 20, and a pure Al sheet having a thickness of 1/15 of these alloy powder compacted material was piled up together. Then, they were extruded to form a composite of pure aluminum/sliding material. After a rolling working, it was roll-pressure-bonded with the back metal of steel under a condition in which a reduction ratio of the steel plate was 40%, so that a composite sliding material was produced. The thickness of the alloy layer at this time was 0.4 mm, the thickness of the pure aluminum layer was 0.1 mm, and the thickness of the steel plate was 1.2 mm.

A seizure test was carried out under the conditions shown in Table 2. The results of the test are as shown in Table 4.

A friction test was carried out as described in example 1. The results of the test are shown in Table 5.

In example 3, a pure aluminum sheet was used as a bonding layer, however, the bonding layer is not limited to the Al sheet and aluminum alloy sheet, pure aluminum powder, and aluminum alloy powder may be extruded and worked together with the materials of example 1.

It can be seen from the analysis of the results of the tests shown in tables 4 and 5 that the materials of the present invention have antiseizure property comparable to or greater than those of the prior art and further improved resistance to wear. For example, when h-BN, SiC or W, which are indispensable compositions of the present invention, is added to the same constituents of Sample Nos. 18, 19 and 20 of the products of the prior art, it can be seen that antiseizure property and resistance to wear have been greatly improved, as indicated by the results of the experiment with Sample Nos. 8, 9 and 10. Therefore, the present invention achieves a desired purpose.

Many different embodiments of the present invention can be made without departing from the spirit and scope thereof; therefore, it is to be understood that this invention is not limited to the specific embodiments described above and is solely defined in the appended claims.

Method of evaluation

When the rear surface temperature of a bearing reaches 200° C. or the frictional force reaches 50 kgf·m or greater, seizure was deemed to occur.

TABLE 1

| Structure | Sample No. | Al | Si | Mg | Cu | Ni | Zn | Mn | Sn | Pb | Bi |
|---|---|---|---|---|---|---|---|---|---|---|---|
| Product of the present invention | | | | | | | | | | | |
| With back metal | 1 | balance | — | — | — | — | — | — | — | — | — |
| | 2 | balance | — | — | — | — | — | — | 0.2 | — | — |
| With intermediate layer | 3 | balance | — | — | — | — | — | — | 17 | 2 | 1 |
| Single substance | 4 | balance | — | — | — | — | — | — | — | — | — |
| | 5 | balance | — | — | — | — | — | — | — | — | — |
| With back metal | 6 | balance | — | — | 0.1 | — | — | — | — | — | — |
| | 7 | balance | 11 | 1 | 1 | 1 | 6 | — | — | — | — |
| With intermediate layer | 8 | balance | 3.1 | 0.5 | 3.0 | — | — | — | — | — | — |
| | 9 | balance | 2.9 | — | 0.6 | — | — | 0.3 | — | — | — |
| | 10 | balance | 2.9 | — | 0.6 | — | — | — | — | — | — |
| | 11 | balance | 2 | — | 1 | — | — | — | 5 | 1 | — |
| | 12 | balance | 3 | — | 1 | — | — | 0.3 | — | — | — |
| | 13 | balance | — | — | — | — | — | — | 3 | — | 1 |
| | 14 | balance | 2 | — | — | — | — | — | 5 | 1 | — |
| Single substance | 15 | balance | — | — | — | — | — | — | 6 | — | — |
| With back metal | 16 | balance | 3 | 1 | 1 | — | 4 | — | — | 2 | — |
| With intermediate layer | 17 | balance | 2.5 | — | 0.8 | 1 | — | — | 5 | 1 | — |
| Product of prior art | 18 | balance | 3.1 | — | 3.0 | — | — | — | — | — | — |
| With intermediate layer | 19 | balance | 2.9 | — | 0.6 | — | — | — | — | — | — |
| | 20 | balance | 2.9 | — | 0.6 | — | — | — | — | — | — |

| Structure | Sample No. | h-BN | TiN | SiC | WC | Fe$_2$P | Ni$_2$B | Graphite | PbF$_2$ |
|---|---|---|---|---|---|---|---|---|---|
| Product of the present invention | | | | | | | | | |
| With back metal | 1 | 8 | — | — | — | — | — | — | — |
| | 2 | — | — | 5 | — | — | — | — | — |
| With intermediate layer | 3 | — | 4 | — | — | — | — | — | — |
| Single substance | 4 | 1 | — | — | — | 5 | 15 | 0.1 | — |
| | 5 | — | — | 1 | 3 | — | — | 2 | 18 |
| With back metal | 6 | 1 | — | — | — | — | 5 | — | — |
| | 7 | 3 | — | — | — | — | — | — | — |
| With intermediate layer | 8 | 2 | — | — | — | — | — | 5 | — |
| | 9 | — | — | 1 | — | — | — | — | 10 |
| | 10 | — | — | — | 2 | — | — | 5 | — |
| | 11 | 5 | — | — | — | — | — | — | — |
| | 12 | — | 3 | — | — | — | — | 2 | — |
| | 13 | — | — | — | 5 | — | — | 2 | 3 |
| | 14 | — | — | — | — | — | 8 | — | — |
| Single substance | 15 | 10 | — | — | 5 | 5 | 10 | — | — |
| With back metal | 16 | — | — | 0.5 | — | — | — | — | — |
| With intermediate layer | 17 | 3 | — | — | — | — | — | — | — |
| Product of prior art | 18 | — | — | — | — | — | — | 5 | — |
| With intermediate layer | 19 | — | — | — | — | — | — | — | 10 |
| | 20 | — | — | — | — | — | — | 5 | — |

Note: Explanation of structure: with back metal (composite substance of alloy + back metal), with intermediate (composite substance of alloy + intermediate bonding layer + back metal), and single substance (alloy only)

TABLE 2

| Conditions for seizure test | |
|---|---|
| Dimensions of bearing | Outer diameter 27.2 mm inner diameter 22 mm |
| Number of rotations | 1500 r.p.m. |
| Peripheral velocity | 1.93 m/s |
| Lubricating material | SAE #30 |
| Lubricating method | Oil bath |
| Lubricating temperature | Room temperature (at start-up time) |
| Shaft material | S55C |
| Roughness | 0.3 Rmax. |
| Load pattern (Static load) | Loads are accumulated at an interval of 30 min. until seizure occurs. |

| Conditions for wear test | |
|---|---|
| Dimensions of bearing | Outer diameter 27.2 mm inner diameter 22 mm |
| Number of rotations | 1500 r.p.m. |
| Peripheral velocity | 1.93 m/s |
| Lubricating material | SAE #30 |
| Lubricating method | Oil bath |
| Lubricating temperature | Room temperature (°C. at start-up time) |
| Shaft material | S55C |
| Load | 117.9 kg/cm$^2$ |
| Testing time | 150 hr. |

TABLE 3

TABLE 4

Results of seizure test — Seizure area pressure (kgf/cm²)

| Product name | Sample No. | 58.8 | 88.4 | 117.9 | 147.4 | 176.9 | 206.4 | 235.8 | 265.3 | 294.8 | No seizure |
|---|---|---|---|---|---|---|---|---|---|---|---|
| Products of the Present Invention | 1–17 | | | | | | | | | | |
| Products of the Prior Art | 18–20 | | | | | | | | | | |

TABLE 5

Results of wear test — Quantity of wear (μm)

| Product name | Sample No. | 50 | 100 | 150 |
|---|---|---|---|---|
| Products of the Present Invention | 1–17 | | | |
| Products of the Prior Art | 18–20 | | | |

What is claimed is:

1. A sliding material of a single substance made by extruding powder, comprising aluminum as a main constituent, and at least one metal compound of 0.5 to 30 wt. % in total selected from the group consisting of metal nitride, metal carbide, metal phosphide, and metal boride each of which has a hardness not less than 200 in Vicker's hardness, said metal compound being uniformly and finely dispersed in aluminum.

2. The sliding material of a single substance as claimed in claim 1, further comprising a lubricant material of low-melting point metal of 0.1 to 20 wt. % in total.

3. The sliding material of a single substance as claimed in claim 1, further comprising a solid lubricant material of 0.1 to 20 wt. % in total.

4. The sliding material of a single substance as claimed in claim 1, further comprising a lubricant material of low-melting point metal of 0.1 to 20 wt. % in total and a solid lubricant material of 0.1 to 20 wt. % in total.

5. The sliding material of a single substance as claimed in claim 1, further comprising an aluminum matrix-strengthening material of 0.1 to 20 wt. % in total.

6. A composite sliding material, wherein the sliding material set forth in claim 1 is bonded to a back metal of steel.

7. The composite sliding material, wherein a bonding layer is provided between the sliding material set forth in claim 1 and the back metal of steel.

* * * * *